United States Patent [19]

Kapaan

[11] 4,449,957
[45] May 22, 1984

[54] AUTOMATICALLY VARIABLE DRIVE APPARATUS HAVING AT LEAST ONE V-BELT RUNNING OVER VARIABLE DIAMETER PULLEYS

[75] Inventor: Hendrikus J. Kapaan, Ijsselstein, Netherlands

[73] Assignee: SKF Industrial Trading & Development Company B.V., Nieuwegein, Netherlands

[21] Appl. No.: 960,924

[22] Filed: Nov. 15, 1978

[30] Foreign Application Priority Data

Nov. 16, 1977 [NL] Netherlands .................... 7712625

[51] Int. Cl.³ .................. F16H 55/56; F16H 3/14; F16D 21/04
[52] U.S. Cl. .................................. 474/14; 74/378; 74/665 H; 192/21; 403/259; 403/337
[58] Field of Search .................. 403/259, 336, 337; 74/230.17 E, 230.17 D, 665 F, 722, 378, 665 H; 474/14; 192/21

[56] References Cited

U.S. PATENT DOCUMENTS

| 2,664,757 | 1/1954 | Shaw .................... 74/230.17 D |
| 2,803,474 | 8/1957 | Wilson ........................ 403/336 |
| 2,873,587 | 2/1959 | Lyritis ...................... 403/337 X |
| 2,878,690 | 3/1959 | Capron et al. ............. 74/722 X |
| 3,466,074 | 9/1969 | Heth ............................ 403/337 |

FOREIGN PATENT DOCUMENTS

| 493078 | 5/1953 | Canada ........................... 74/722 |
| 718666 | 2/1942 | Fed. Rep. of Germany ...... 403/337 |
| 1088359 | 9/1960 | Fed. Rep. of Germany ........ 74/722 |
| 977823 | 11/1950 | France ........................... 403/336 |
| 95773 | 9/1960 | Netherlands . |
| 86808 | 6/1956 | Norway ........................ 403/336 |
| 9046 | of 1885 | United Kingdom ............. 403/337 |
| 651188 | 3/1951 | United Kingdom ............. 403/337 |

Primary Examiner—Allan D. Hermann
Attorney, Agent, or Firm—Daniel M. Rosen; J. David Dainow

[57] ABSTRACT

A drive apparatus including a driving section and a driven section interconnected by a flexible belt which passes over pulley members respectively associated with each of the driving and driven sections. At least one of the driving and driven sections comprises a housing, a central shaft section mounted for rotation within the housing, the central shaft section having a gear assembly provided on a central portion thereof for rotation therewith, and first flange means provided on at least one of the end portions thereof. At least one lateral shaft section is provided having a pulley member mounted thereon for rotation therewith, the lateral shaft section having second flange means provided on one of its end portions. The lateral shaft section is removably connected to the central shaft section by means of connector elements interconnecting said first and second flange means.

7 Claims, 6 Drawing Figures

AUTOMATICALLY VARIABLE DRIVE APPARATUS HAVING AT LEAST ONE V-BELT RUNNING OVER VARIABLE DIAMETER PULLEYS

BACKGROUND OF THE INVENTION

The invention relates to an automatically variable drive apparatus including a driving section and a driven section coupled thereto by means of at least one V-belt running over variable diameter pulleys, each pulley comprising a first half-pulley member fixed to a shaft mounted in a housing and rotatable therewith and a second half-pulley member axially slidably disposed over the same shaft, but keyed to it for rotation therewith. Means are provided for adjusting the relative axial positions of the half-pulley members on the shaft for adjusting the diameter of the pulley. These means may comprise, for the driving section for example, centrifugal weights coupled to the shaft and for the driven section, for example, a spring device. The shaft of the driving section is driven by a driving shaft via a conical or bevel gear mounted on the driving shaft which engages with at least one conical or bevel gear, freely rotatable around the shaft of the driving section, selectively coupled for rotation with the shaft and mounted axially and radially in relation to the housing. Such a drive apparatus is generally described in Dutch Pat. No. 95,773.

Figure 1:
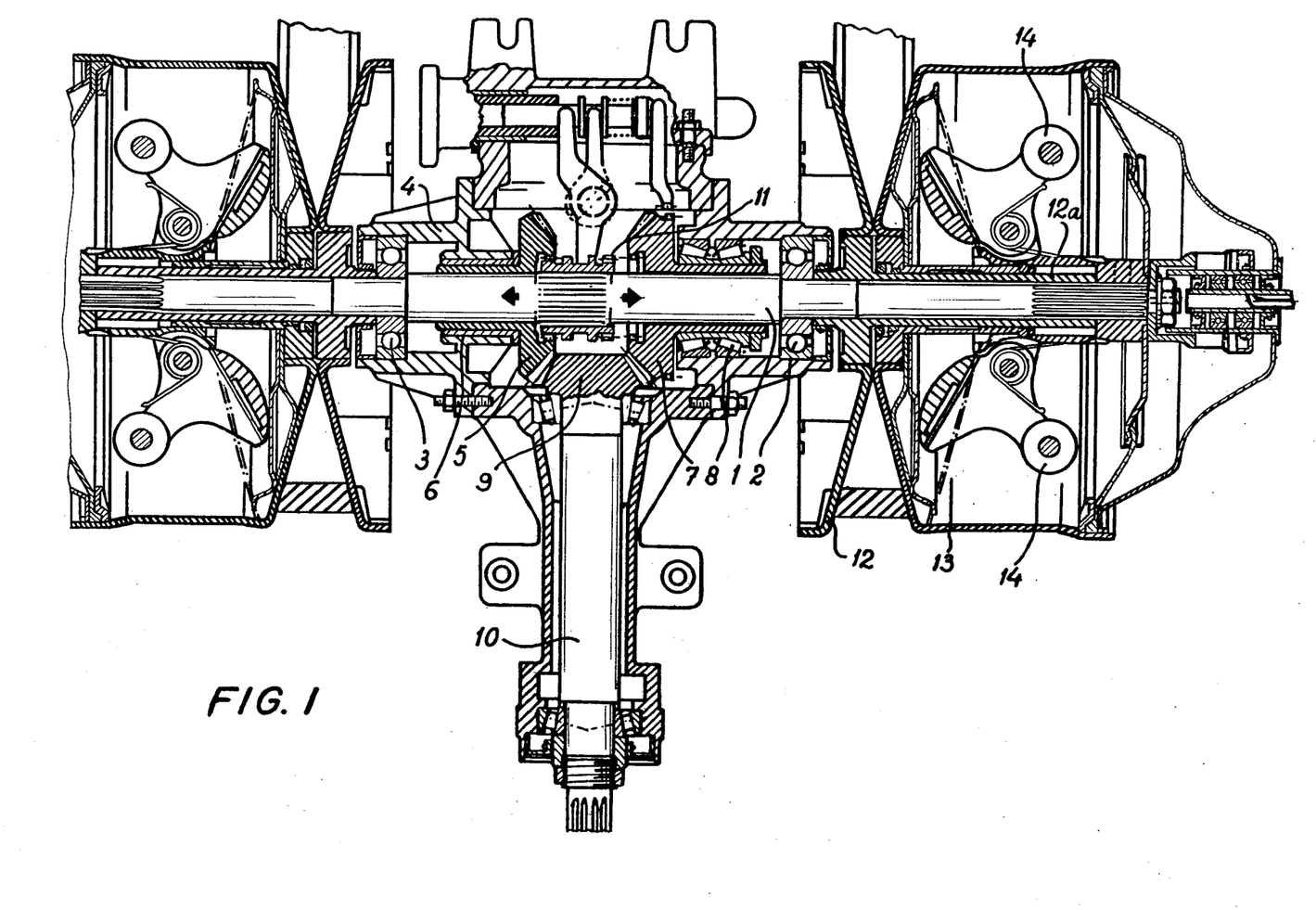
FIGS. 1 and 2 are, respectively sectional views of the driving and driven sections of a prior art drive apparatus.

The driving section of a further development of the known drive apparatus of this type is shown in FIG. 1. Such prior art driving section, provided with two variable diameter pulleys has, as shown in FIG. 1, a single, unitary elongate shaft 1 which is mounted in a housing 4 by means of ball bearings 2 and 3. In this case, a conical gear 5 carried by shaft 1 is mounted thereto by means of a plain bearing 6 while a conical gear 7 is also carried by shaft 1 and is mounted thereto by means of a rolling bearing 8 in the housing 4. Thus, these conical gears 5, 7 are normally rotatable with respect to the shaft 1. The conical gears 5 and 7, which engage a conical gear 9 on the driving shaft 10, can be alternately coupled to the shaft 1 to rotate the same by means of the slidable sleeve 11 which itself is coupled for rotation with shaft 1 by means of splines formed on shaft 1. There are also provided on shaft 1 two variable diameter pulleys which each consist of a half-pulley member 12 fixedly mounted on the shaft 1 for rotation therewith and a half-pulley member 13 axially slidably mounted over shaft 1 by means of the boss sleeve 12a of this half-pulley member 12, but linked for rotation therewith by means of splines formed on shaft 1. The axial position of half-pulley member 13 on shaft 1 and therefore, the effective diameter of the pulley is controlled by the action of centrifugal weights 14.

Figure 2:
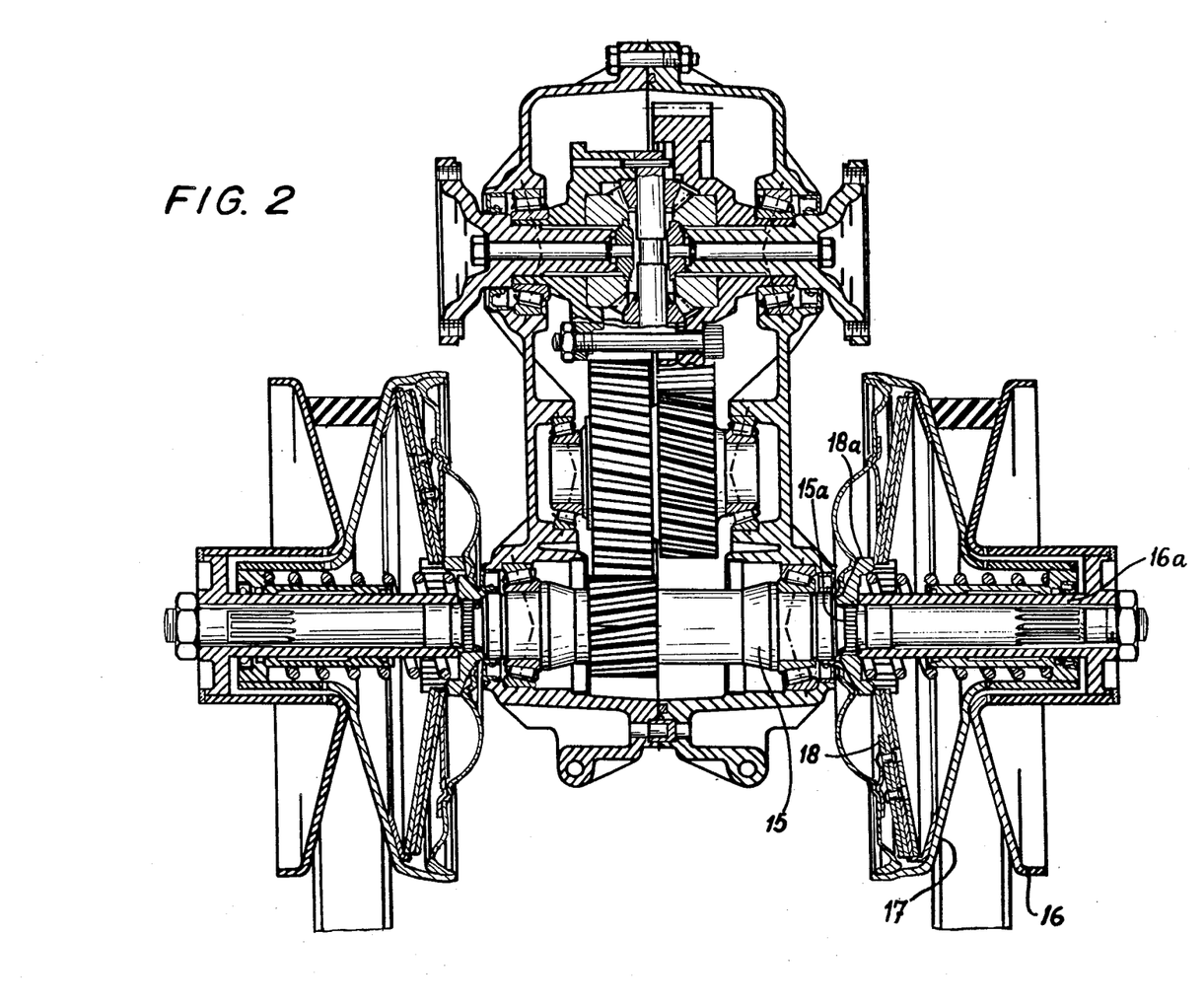

The driven section of this known embodiment is shown in FIG. 2, and similar to the driving section illustrated in FIG. 1 has a single unitary long shaft 15 on which two adjustable diameter pulleys are mounted, each of which includes a half-pulley member 16 fixedly mounted on the shaft 14 and a half-pulley member 17 axially slidably mounted over shaft 14 by means of the boss sleeve 16a of this half-pulley member 16, but linked for rotation therewith by means of splines formed on the shaft 15. The axial position of half-pulley member 16 is controlled by a pack of springs 18 which are biased against the fixed half-pulley member 16. The pack of springs 18 is coupled on the one hand to the half-pulley member 17 and on the other is coupled to a gear-shaped member 18a which is linked via teeth 15a with the shaft 15.

The disadvantages of this known drive are:

that the maintenance or repair—however minor—of the gearbox require necessary and time-consuming and precise dismantling and reassembly of the entire pulley as well as of the elements coupled with it;

replacement of the driving belt involves a complicated adjustment procedure, in connection with the determination of the correct (new) pitch distance of the pulleys;

the mounting of a pulley on a shaft is fairly complicated, while the use of the various different bearing systems respectively for the shaft, conical gears and housing likewise renders the drive fairly complicated in construction.

SUMMARY OF THE INVENTION

The primary object of the present invention is to provide an automatically variable drive of the type described above which does not have the aforementioned disadvantages.

More particularly, it is an object of the present invention to provide a new and improved variable drive apparatus whose maintenance and repair including belt replacement can be accomplished in a relatively uncomplicated manner.

Another object of the present invention is to provide a new and improved variable drive apparatus having a relatively simple construction.

These objects are achieved by providing a drive according to the invention wherein the shaft of the driving section is constructed of two or more sections normally coupled to each other but which can be disassembled. The shaft includes a central shaft section around which the conical gear or gears can rotate and at least one end of which is provided with a flange, and a right-hand shaft section and/or a left-hand shaft section on which there are mounted respectively a right-hand and a left-hand variable diameter pulley and which are at one end provided with a flange, this flange being removably fixed to the respective flange of the central shaft section.

The conical gear or gears can advantageously be mounted on the central shaft section and thereby abut against the flange or flanges provided at the ends thereof. These flanges are themselves rotatably mounted in the housing by means of rolling bearings, so that by these bearings the entire shaft consisting of the several elements is at the same time rotatably mounted with respect to the housing.

The shaft on which the variable diameter pulleys of the driven section are mounted can also advantageously include two or more sections namely, a central shaft section with at least at one end thereof having a flange rotatably fixed thereto and one or two lateral shaft sections fixed by means of a flange to these flanges.

The lateral shaft sections of the driven section can have the same configuration as the left-hand and right-hand shaft sections of the driving section, so that merely one type of shaft needs to be manufactured with only its length possibly requiring further adaptation.

The fixed half-pulley member can now be fixed for both the driving and driven sections on the left-hand and/or right-hand lateral shaft section.

The flanges provided on the ends of the central shaft section can advantageously be formed by separate members which are coupled by means of a splined joint with the central shaft section.

According to the invention a simple symmetrical construction of both the driving and driven section of the drive apparatus is obtained in which the left-hand and/or right-hand sections of the shaft are interchangeable. Moreover, the pulleys mounted on the left-hand or right-hand sections of the shaft are completely interchangeable as a unit while, for example, in the case of a belt break or a defect on a pulley or gearbox, dismantling and assembling are much simpler than in the case of the known drive.

The assembly of a lateral shaft section and associated variable diameter pulley which is manageable as a unit according to the invention dispenses entirely with the fairly complicated adjustment procedure required in prior art devices of the type described herein after the changing of a driving belt, since the units to be coupled are fixed directly on the relevant central shaft sections of the driving and driven sections between which the pitch distance is, in principle, constant. This pitch distance is variable in the prior art construction since, on changing a driving belt, the belt must be drawn over a pulley and consequently a re-adjustment of the pitch distance is subsequently necessary.

DESCRIPTION OF THE DRAWINGS

The invention will now be described in further detail with reference to the drawings in which.

DETAILED DESCRIPTION OF THE PREFERRED EMBODIMENTS

Referring now to the drawings, the driving and driven sections of a typical automatically variable drive apparatus of the prior art type is illustrated in FIGS. 1 and 2 which have been described in detail above and which are subject to the disadvantages previously discussed.

Figure 3:
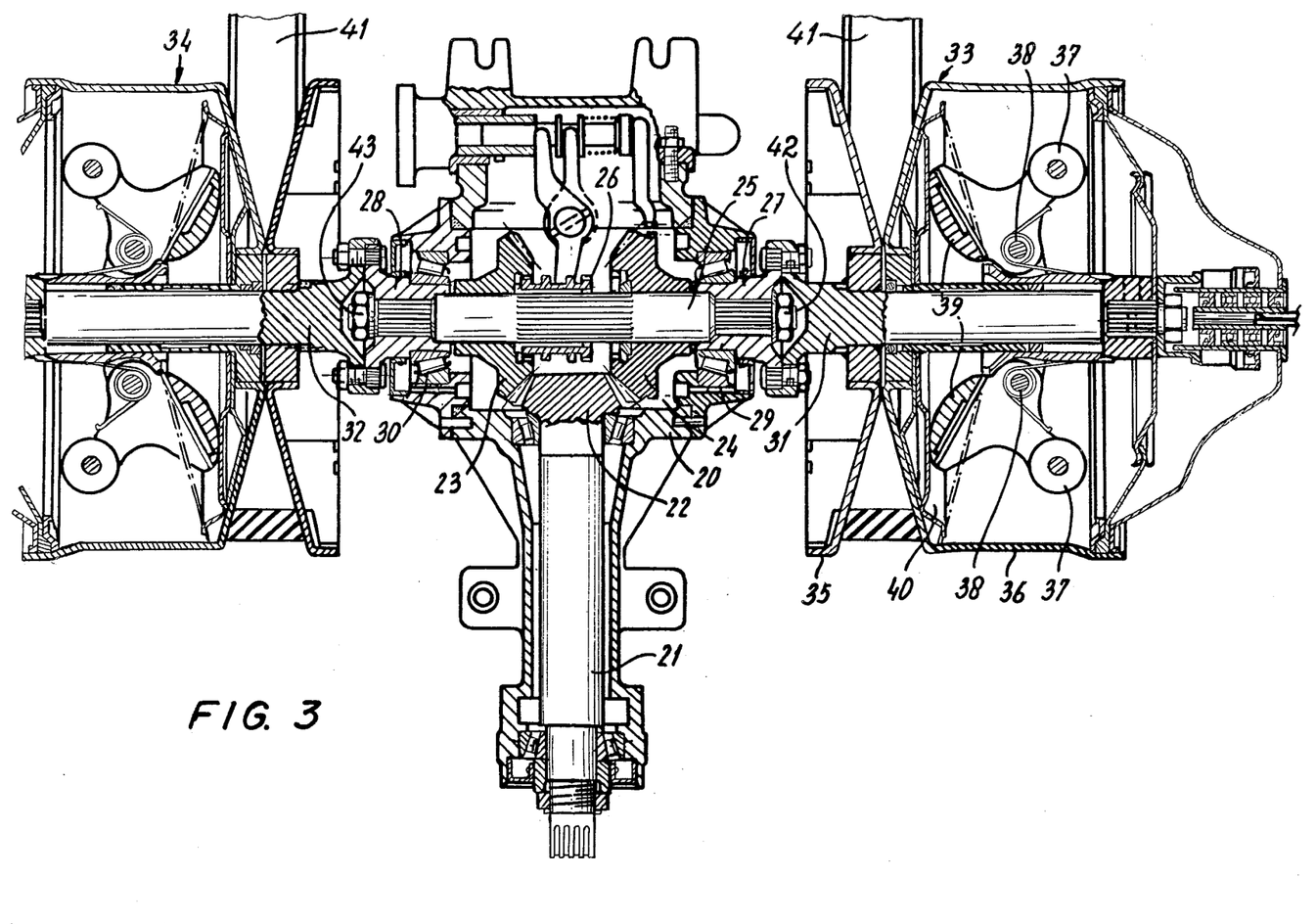
FIGS. 3 and 4 are respectively sectional views of the driving section and the driven section of a drive apparatus according to the invention.

As shown in FIG. 3 the driving section of the present invention comprises an input driving shaft 21 mounted in a housing 20 which is provided at its end with a drive conical or bevel gear 22 which meshes with the conical gears 23 and 24 provided on a central shaft section 25. The conical gears 23 and 24 can rotate freely around the central shaft section 25 while these conical gears can each be alternatively coupled for rotation with the central shaft section 25 by means of the axially slidable sleeve 26 which is splined to the central shaft section and can slide over the shaft section 23 to selectively engage one of the gears 23,24.

Both conical gears 23 and 24 are mounted directly on the central shaft section 25 and abut at their outer ends against flanges 28, 27, respectively, which are themselves mounted on the ends of central shaft section 25. These flanges or hubs including flanges, and 27, 28 are defined by separate members, i.e., are not integrally formed with central shaft section 25, and are coupled to the central shaft section 25 by means of a splined joint and secured so their positions are axially adjustable by nuts 42,43 threadedly secured to the ends of central shaft section 25. The flanges 27 and 28 are mounted in housing 20 by means of rolling bearings 29, 30, respectively, having conical roller guides so that the central shaft section 25 is at the same time rotatably mounted in housing 20. Each bearing is situated between the outer circumferential surface of a hub and the housing. By turning the nuts 42, 43 to a greater or lesser extent, the bearings 29, 30 can be given an initial tension.

Lateral shaft sections 31 and 32 are provided and themselves have flanges 31a, 32a, respectively, integrally formed at their ends. The lateral shaft sections 31 and 32 are removably attached coaxially to the respective ends of central shaft section 25 by fixing flanges 31a and 32a to the flanges 27 and 28 respectively, by conventional removable fasteners, such as by bolts, so that a continuous shaft is obtained.

The variable diameter pulleys 33 and 34 are mounted on the lateral shaft sections 31 and 32 respectively. These pulleys are completely identical to one another so that only the pulley 33 will be described in further detail.

The pulley 33 comprises a first shallow, conically shaped half-pulley member 35 axially fixed over the lateral shaft section 31 for rotation therewith, and a second half-pulley member 36 which can slide axially over the shaft section 31, but which is linked with it for joint rotation. Second half-pulley member 36 is defined by a conical surface extending from the outer periphery thereof to define a working space therewithin. Apparatus for moving the second half-pulley member 36 axially over lateral shaft section 31 in response to a change in the rotational velocity of shaft section 31 is provided within the working space defined by half-pulley member 36. Such apparatus is conventional and, as shown, includes a set of centrifugal weights 37 located circumferentially around shaft section 31, each of which can pivot around a shaft 38. A pressure surface 39 is associated with each centrifugal weight 37 which normally is in contact with a bearing surface 40 located within half-pulley member 36. In the situation shown the centrifugal weights 37 have swung outwards in response to an increased rotational velocity of the shaft section, as a result of which the slidable half-pulley member 36 is urged under the action of pressure surfaces 39 against the fixed half-pulley member 35 so that the V-belt 41 runs on a large effective diameter defined between the conical surfaces of the half-pulley members 35 and 36. It will be understood that a decrease in rotational velocity of the shaft section results in a movement of half-pulley member 36 away fron half-pulley member 35 to thereby decrease the effective diameter of pulley 33.

Figure 4:
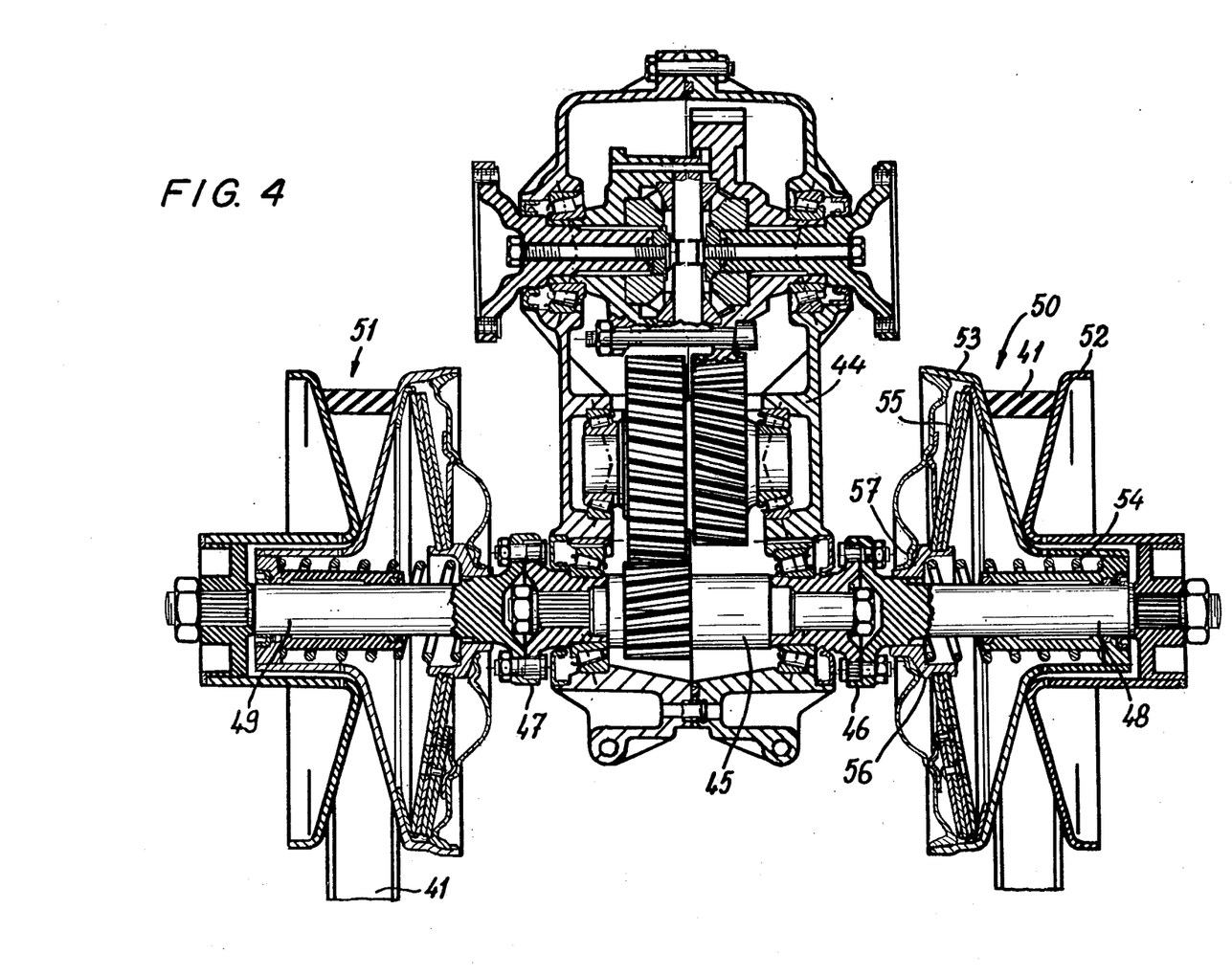

As shown in FIG. 4 the driven section of the drive comprises a central shaft section 45 rotatably mounted in a housing 44. Central shaft section 45 is provided at both of its ends with flanges 46 and 47 respectively which are splined thereto for rotation therewith. Similarly to the flanges 27, 28 of the driving section, the flanges 46, 47 are defined by separate members, i.e., are not integrally formed with central shaft section 45, which are secured by nuts threadedly fastened to the ends of central shaft section 45. Lateral shaft sections 48, 49 are removably connected to the respective ends of central shaft section 45 by integrally formed flanges 48a, 49a which are fastened to flanges 46, 47 by conventional connectors such as bolts. Variable diameter pulleys 50 and 51 respectively are mounted on the lateral shaft sections 48 and 49, these pulleys being identical to one another so that only the pulley 50 will be described in further detail. The pulley 50 comprises a half-pulley member 52 fixedly mounted on the shaft section 48 for rotation therewith and a half-pulley member 53 also mounted for rotation with the shaft section, but so that it can axially slide on this shaft. The slidable half-pulley member 53 is normally urged by a spring 54 and by the pack of springs 55 against the fixed half-pulley member 52 in a manner which will be readily understood by those skilled in the art. The pack of springs 55 is connected to a gear-shaped member 56 which engages an axially directed toothing 57 on the shaft section 45. In the position shown in FIG. 4, the V-belt 41 which extends between the driving and driven sections runs on the largest effective diameter of the adjustable pulley 50, this position corresponding to the situation wherein the pulley 33 of the driving section has its smallest effective diameter, i.e., wherein the centrifugal weights 37 are not swung outwards by the centrifugal force, and the half-pulley member 36 lies at a distance from the half-pulley member 35.

FIG. 3 shows clearly the relatively simple symmetrical construction of the driving section of the drive apparatus including, the advantageous bearing construction as well as the shaft construction on which the pulleys are mounted, which is seen to contain fewer constructional elements compared with the known embodiment illustrated in FIG. 1. Also evident is the simple manner in which maintenance and repair of the drive apparatus can be accomplished. Thus, should work be required on the gearbox comprising the conical gears 22, 23, 24, it is only necessary to unfasten the bolt connections which attach the flange pairs 28, 32a and 27, 31a, whereby the lateral shaft sections 31, 32 (and associated pulleys 33, 34) may be removed, unscrew the units 42, 43 and remove flanges 31a and 32a. The drive belts 41 may be similarly easily replaced.

A comparison of the driving and driven sections illustrated in FIGS. 3 and 4 clearly shows the similar form of on the one hand the lateral shaft sections 31 and 32 of the driving section and the lateral shaft sections 49 and 48 of the driven section. Of course, such similarities give rise to the same advantages with respect to the driven section.

Figure 5:
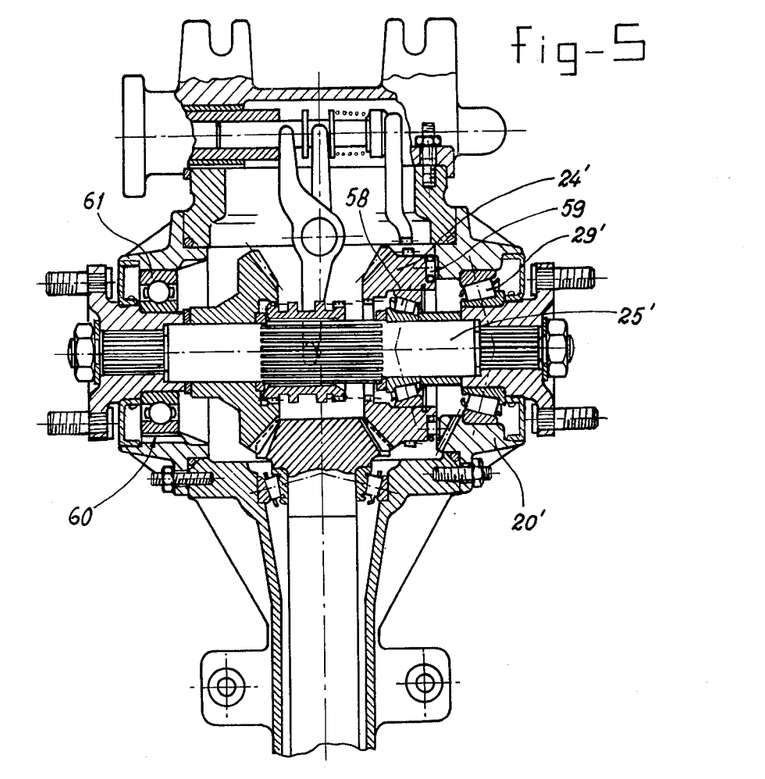
FIG. 5 is a sectional view of another embodiment of the central shaft section of the present invention and FIG. 6 is a section view of yet another embodiment of the central shaft section.

FIG. 5 shows another embodiment of the central shaft section, in which the same or corresponding parts are indicated by the same reference numeral as in FIG. 3, but with a ' sign.

In this embodiment the conical gear 24' is mounted on the central shaft section 25' by means of a conical roller bearing 58, while a needle bearing 59 is located between the conical gear 24' and the housing 20'. The right-hand part (as seen in FIG. 5) of the shaft section 25' with the bearings 29' and 58 here forms a pre-stressed bearing unit.

The bearing on the left side comprises a deep groove ball bearing 60 the outer race 61 of which is housed in a straight continuous bore, so that changes due to manufacturing tolerances or changes in temperature can be accommodated.

Figure 6:
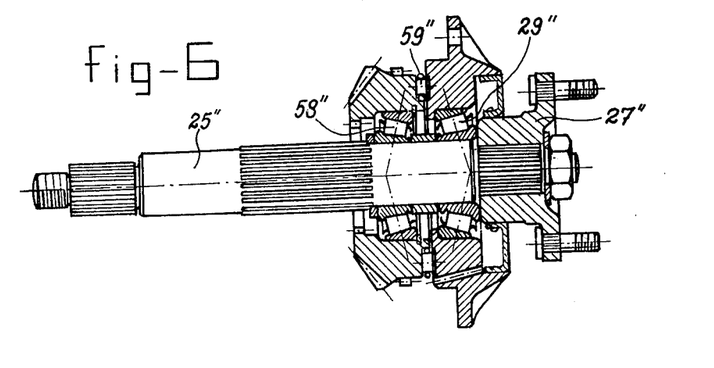

In the further embodiment of the central shaft section, as shown in FIG. 6, in which the same or corresponding parts are indicated by the same reference numeral as in FIGS. 3 and 5, but in this case with the addition of a " sign, the roller bearing 29" is placed on the central shaft section 25", directly inwardly of the flange 27". Here, too, the element shown constitutes a pre-stressed bearing unit. Obviously, numerous variations and modifications of the present invention are possible in the light of the above teaching. It is therefore understood that within the scope of the appended claims the invention may be practiced otherwise than as specifically described herein.

What is claimed is:

1. In an automatically variable drive apparatus including a driving section and a driven section which are coupled together by means of at least one V-belt running over adjustable diameter pulleys, in which each pulley comprises a first half-pulley member fixed on for rotation with a first shaft rotatably mounted in a housing in each of said drive and driven sections and a second half-pulley member axially slidably mounted on said first shaft for rotation therewith, said pulley including means for adjusting the relative axial location of said second half-pulley member in response to the rotational velocity of said shaft, said first shaft of the driving section being driven by a driving shaft via a drive conical gear mounted on said driving shaft which engages with at least one first conical gear mounted for free rotation around said first shaft, means for selectively coupling said first conical gear to said first shaft for rotation therewith; the improvement wherein said first shaft of the driving section comprises at least one bearing supported central shaft around which said first conical gear can rotate, a first flange at one end of said central shaft, said flanged central shaft together with said driving section being a first integral assembly, at least one lateral shaft on which is mounted one of said adjustable diameter pulleys which is provided at one end with a second flange to form a lateral section being a second integral assembly, the second flange being removeably fixed to the first flange of the central shaft, thereby allowing a detachable construction of said two integral assemblies.

2. In a drive apparatus according to claim 1, the improvement wherein said first shaft in said driven section on which the pulleys are mounted comprises a central shaft section with at least one of its ends being provided with a flange and at least one lateral shaft section which is provided at one end with a flange fixed to said central shaft section by means of connecting said respective flanges.

3. In a drive apparatus according to claim 1, the improvement wherein a lateral shaft section and a pulley constitute an interchangeable unit.

4. A drive apparatus as recited in claim 1 wherein said first flange means comprise flange members separately formed from said central shaft section and removable therefrom and further including means for removably fastening said flange members to said central shaft section.

5. A drive apparatus as recited in claim 1 wherein said pulley member is a variable diameter pulley member.

6. A drive apparatus as recited in claim 1 wherein said lateral shaft section comprises an interchangeable unit.

7. In an automatically variable drive apparatus including a driving section and a driven section which are coupled together by means of at least one V-belt running over adjustable diameter pulleys, in which each pulley comprises a first half-pulley member fixed on for rotation with a first shaft rotatably mounted in a housing in each of said drive and driven sections and a second half-pulley member axially slidably mounted on said first shaft for rotation therewith, said pulley including means for adjusting the relative axial location of said second half-pulley member in response to the rotational velocity of said shaft, said first shaft of the driving section being driven by a driving shaft via a drive conical gear mounted on said driving shaft which engages with at least one first conical gear mounted for free rotation around said first shaft, means for selectively coupling said first conical gear to said first shaft for rotation therewith; the improvement wherein said first shaft of the driving sections comprises at least one bearing supported central shaft around which said first conical gear can rotate, a first flange at one end of said central shaft, said flanged central shaft together with said driving section being a first integral assembly, at least one lateral shaft on which is mounted one of said adjustable diameter pulleys which is provided at one end with a second flange to form a lateral section being a second integral assembly, the second flange being removeably fixed to the first flange of the central shaft, thereby allowing a detachable construction of said two integral assemblies wherein the first and second flanges of the central shaft section are formed by separate members which are coupled by means of a splined joint with said central shaft section and adapted to adjustably be secured to said central shaft by a nut.

* * * * *

UNITED STATES PATENT AND TRADEMARK OFFICE
CERTIFICATE OF CORRECTION

PATENT NO. : 4,449,957
DATED : May 22, 1984
INVENTOR(S) : HENDRIKUS J. KAPAAN

It is certified that error appears in the above-identified patent and that said Letters Patent is hereby corrected as shown below:

Column 4, line 54, change "fron" to --from--.

Column 6, line 11, delete "driving" and insert --drive--.

Column 6, line 28, change "section"to --sections--.

Column 6, line 28, after "shaft" insert --section on which said first conical gear is mounted--.

Column 6, line 39, delete "assemblies." and insert --assemblies, said first flange being mounted by means of a rolling bearing with respect to the housing, so that said first shaft, including said central and lateral shaft sections, is at the same time mounted in said housing by said bearings--.

Signed and Sealed this

Seventh Day of January 1986

[SEAL]

Attest:

DONALD J. QUIGG

Attesting Officer

Commissioner of Patents and Trademarks